(12) United States Patent
Tanaka et al.

(10) Patent No.: US 11,350,324 B2
(45) Date of Patent: May 31, 2022

(54) COMMUNICATION APPARATUS AND COMMUNICATION METHOD

(71) Applicant: SONY CORPORATION, Tokyo (JP)

(72) Inventors: Yusuke Tanaka, Tokyo (JP); Kosuke Aio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/969,503

(22) PCT Filed: Dec. 18, 2018

(86) PCT No.: PCT/JP2018/046469
§ 371 (c)(1),
(2) Date: Aug. 12, 2020

(87) PCT Pub. No.: WO2019/163273
PCT Pub. Date: Aug. 29, 2019

(65) Prior Publication Data
US 2020/0413304 A1 Dec. 31, 2020

(30) Foreign Application Priority Data
Feb. 20, 2018 (JP) .............................. JP2018-027539

(51) Int. Cl.
*H04W 4/00* (2018.01)
*H04W 36/00* (2009.01)
*H04W 36/04* (2009.01)

(52) U.S. Cl.
CPC ....... *H04W 36/0061* (2013.01); *H04W 36/04* (2013.01)

(58) Field of Classification Search
CPC .......................... H04W 36/0061; H04W 36/04
See application file for complete search history.

(56) References Cited

U.S. PATENT DOCUMENTS

2002/0012362 A1  1/2002  Yahata et al.
2010/0232399 A1  9/2010  Negishi et al.
(Continued)

FOREIGN PATENT DOCUMENTS

CN    1214821 A    4/1999
EP    0903873 A1   3/1999
(Continued)

OTHER PUBLICATIONS

International Search Report and Written Opinion of PCT Application No. PCT/JP2018/046469, dated Jan. 29, 2019, 08 pages of ISRWO.

*Primary Examiner* — Erika A Washington
(74) *Attorney, Agent, or Firm* — Chip Law Group

(57) ABSTRACT

A communication apparatus and a communication method are provided by which an upper network including a plurality of network groups is formed. A base station transmits a first frame requesting communication for estimating a structure of an upper network to another base station and returns a reply of a second frame to a first frame from the other base station. Then, the base station estimates a structure of the upper network and decides a structure attribute of the base station itself in the upper network on the basis of information acquired through the communications. Then, the base station notifies the other base station or a subordinate terminal of a result of the decision of the structure attribute.

18 Claims, 10 Drawing Sheets

(56) References Cited

U.S. PATENT DOCUMENTS

2012/0190359 A1* 7/2012 Aminaka .............. H04W 24/02
  455/422.1
2016/0192411 A1* 6/2016 Mori ....................... H04W 8/06
  370/329

FOREIGN PATENT DOCUMENTS

| JP | 10-190562 A | 7/1998 |
| JP | 2007-043587 A | 2/2007 |
| JP | 2010-212997 A | 9/2010 |
| JP | 2012-052922 A | 3/2012 |
| WO | 98/031111 A1 | 7/1998 |

\* cited by examiner

FIG.10

| AP | Reporter | Measure | Pathloss |
|---|---|---|---|
| AP1 | AP2 | AP2 | AP2-AP1 |
| AP2 | Myself | Myself | AP3-AP2 |
| AP4 | Myself | Myself | AP3-AP4 |
| AP5 | Myself | Myself | AP3-AP5 |

FIG.11

| AP | Reporter | Measure | Pathloss |
|---|---|---|---|
| AP1 | AP3 | AP2 | AP2-AP1 |
| AP2 | AP3 | AP3 | AP3-AP2 |
| AP3 | Myself | Myself | AP4-AP3 |
| AP5 | Myself | Myself | AP4-AP5 |

FIG.12

| AP | Reporter | Measure | Pathloss | Structure Determination | | | |
|---|---|---|---|---|---|---|---|
| | | | | Edge of ESS | Center of ESS | Overlapped Ratio | Backhaul Type |
| AP1 | AP2 | AP2 | AP2-AP1 | 1 | | | |
| AP2 | Myself | Myself | AP3-AP2 | | 1 | | |
| AP4 | Myself | Myself | AP3-AP4 | | | | |
| AP5 | Myself | Myself | AP3-AP5 | | | | |

FIG.13

| AP | Reporter | Measure | Pathloss | Structure Determination | | | |
|---|---|---|---|---|---|---|---|
| | | | | Edge of ESS | Center of ESS | Overlapped Ratio | Backhaul Type |
| AP1 | AP3 | AP2 | AP2-AP1 | 1 | | | |
| AP2 | AP3 | AP3 | AP3-AP2 | | 1 | | |
| AP3 | Myself | Myself | AP4-AP3 | | 1 | | |
| AP5 | Myself | Myself | AP4-AP5 | | | | |

ND CROSS REFERENCE TO RELATED APPLICATIONS

COMMUNICATION APPARATUS AND COMMUNICATION METHOD

CROSS REFERENCE TO RELATED APPLICATIONS

This application is a U.S. National Phase of International Patent Application No. PCT/JP2018/046469 filed on Dec. 18, 2018, which claims priority benefit of Japanese Patent Application No. JP 2018-027539 filed in the Japan Patent Office on Feb. 20, 2018. Each of the above-referenced applications is hereby incorporated herein by reference in its entirety.

TECHNICAL FIELD

The technology disclosed herein relates to a communication apparatus and a communication method by which an upper network including a plurality of network groups is formed.

BACKGROUND ART

In recent years, in addition to a general access point (AP), apparatuses functioning as APs such as AV apparatuses having AP functions, agent apparatuses, and apparatuses configuring a smart home are increasing, and it is supposed that many apparatuses that also have AP functions will be installed in a general home. Usually, it is supposed that an AP installed in a general home is connected to a single backhaul or a small number of backhauls and connected to a wide-area network. In such a communication environment as just described, it is considered that it is desired from a point of view of usability that a user connects its own terminal (STA) to one home network without being aware of the presence of individual APs in the home. In this case, it is supposed that the plurality of APs in the home constructs, in addition to a network (BSS: Basic Service Set) that is formed from and supervises the APs themselves, an upper network (ESS: Extended Service Set) including a plurality of BSSs.

Heretofore, an ESS including a plurality of BSSs is generally configured in an environment in which arrangement of APs and so forth are designed in advance such as an office or the like. Further, in many cases, various parameters based on an ESS structure such as arrangement of APs, communicatable ranges of the APs and so forth are inputted in advance and operated. In contrast, in a general home, AP arrangement and so forth are seldom designed, and besides, the number of APs that are installed is not fixed. Therefore, in order to operate an ESS in a general home, it is necessary for each AP to decide an ESS structure and perform setting of various parameters. It lacks in usability to cause a user in a home to perform such a setting work as just described.

For example, proposed is a system that includes, in a situation in which a base station whose arrangement is known in advance exists, a receiving station and a position calculation unit that perform frame exchange and position decision on the basis of a result of measurement in the frame exchange performed between the base station and a wireless terminal (for example, refer to PTL 1). However, in such a system as just described, it is necessary that arrangement of the base station is known to the receiving station and the position calculation unit. Further, this system has uncertainties in regard to a method for constructing an ESS or a method for setting a parameter in each of APs that are components of an ESS.

Further, a proposal has been made for an apparatus position detection system that detects, when an apparatus is newly added to a plurality of apparatuses whose arrangement is known in advance, the position of the added apparatus by using a wireless communication intensity (for example, refer to PTL 2). However, also in such a system as just described, presence of apparatus whose arrangement is known is necessary. Further, this system has uncertainties in regard to a method for constructing an ESS or a method for setting a parameter to each of APs that are components of an ESS.

CITATION LIST

Patent Literature

[PTL 1]
JP 2007-43587A
[PTL 2]
JP 2012-52922A

SUMMARY

Technical Problem

The object of the technology disclosed herein resides in provision of a communication apparatus and a communication method by which an upper network including a plurality of network groups is formed.

Solution to Problem

The technology disclosed herein has been made taking the subject described above into account, and a first aspect of the technology is a communication apparatus including:

a communication section configured to transmit and receive a wireless signal; and a control section configured to control transmission and reception of the wireless signal, in which the control section controls communication for estimating a structure of an upper network.

The communication apparatus operates basically as a base station, transmits a first frame requesting communication for estimating a structure of an upper network to another base station, and returns a reply of a second frame to a first frame from the another base station. Then, when the communication apparatus that operates as a base station estimates a structure of the upper network and decides a structure attribute of the base station itself in the upper network on the basis of information acquired through the communications, the base station notifies another base station or a subordinate terminal of a result of the decision of the structure attribute.

Meanwhile, a second aspect of the technology disclosed herein is a communication method for a communication apparatus that operates as a base station, the method including:

a step of carrying out communication for estimating a structure of an upper network with another base station;

a step of performing, on the basis of a result acquired by communication for estimating the structure of the upper network, estimation of a structure of the upper network and performing making decision of a structure attribute of the base station itself in the upper network; and a step of issuing a notification of information relating to a decision result of a structure attribute of the base station itself to another base station or a subordinate terminal.

Advantageous Effect of Invention

According to the technology disclosed herein, a communication apparatus and a communication method can be provided by which an upper network including a plurality of network groups is efficiently formed in an environment in which arrangement and so forth of base stations are not designed in advance and the number of such base stations is also not fixed.

It is to be noted that the effect described herein is exemplary to the last, and the effect of the present invention is not limited to this. Further, the present invention sometimes exhibits an additional effect or effects.

Further objects, features, and advantages of the technology disclosed herein will become apparent from the more detailed description based on the embodiment hereinafter described and the accompanying drawings.

BRIEF DESCRIPTION OF DRAWINGS

FIG. 10 is a view depicting an example of a configuration of an internal table retained by an AP 3.

FIG. 11 is a view depicting an example of a configuration of an internal table retained by an AP 4.

FIG. 12 is a view depicting an example of a configuration of an internal table that is retained by the AP 3 and in which items for Structure Determination are added.

FIG. 13 is a view depicting an example of a configuration of an internal table that is retained by the AP 4 and in which items for Structure Determination are added.

DESCRIPTION OF EMBODIMENT

In the following, an embodiment of the technology disclosed herein is described in detail with reference to the drawings.

The present specification discloses below a method for configuring an appropriate ESS in an environment in which arrangement and so forth of APs are not designed in advance and the number of APs is also not fixed. According to the technology disclosed herein, each AP performs request and reply of a signal for estimating an ESS structure therebetween. Further, each AP estimates an ESS structure according to the number of signals detected and intensities of the signals, to decide a structure attribute of the AP itself in the ESS. Further, each AP adds, on the basis of a result of the decision, information relating to the structure attribute thereof to a signal to be transmitted from the AP itself and performs communication.

According to the technology disclosed herein, in an environment in which AP arrangement and the number are not designed in advance, each AP itself can perform formation of an ESS. Further, since each AP can estimate a structure of an ESS and decide a structure attribute of the AP itself, a manager is unnecessary. Further, each AP can notify surrounding APs and a subordinate STA of an estimation result of the structure of the ESS and the structure attribute of the AP itself.

By performing such notification, the AP allows the subordinate STA to appropriately decide whether re-connection from an AP positioned at an end of the ESS to another AP is to be performed. Further, the AP allows the subordinate STA to appropriately decide that re-connection from an AP positioned in a middle of the ESS to another AP is not performed. Further, the AP allows another AP, which has a communicatable range overlapping with that of the AP itself, to appropriately decide whether adjustment of the communicatable range is to be performed, and interference with the communicatable range of the AP itself can be suppressed.

Figure 1:
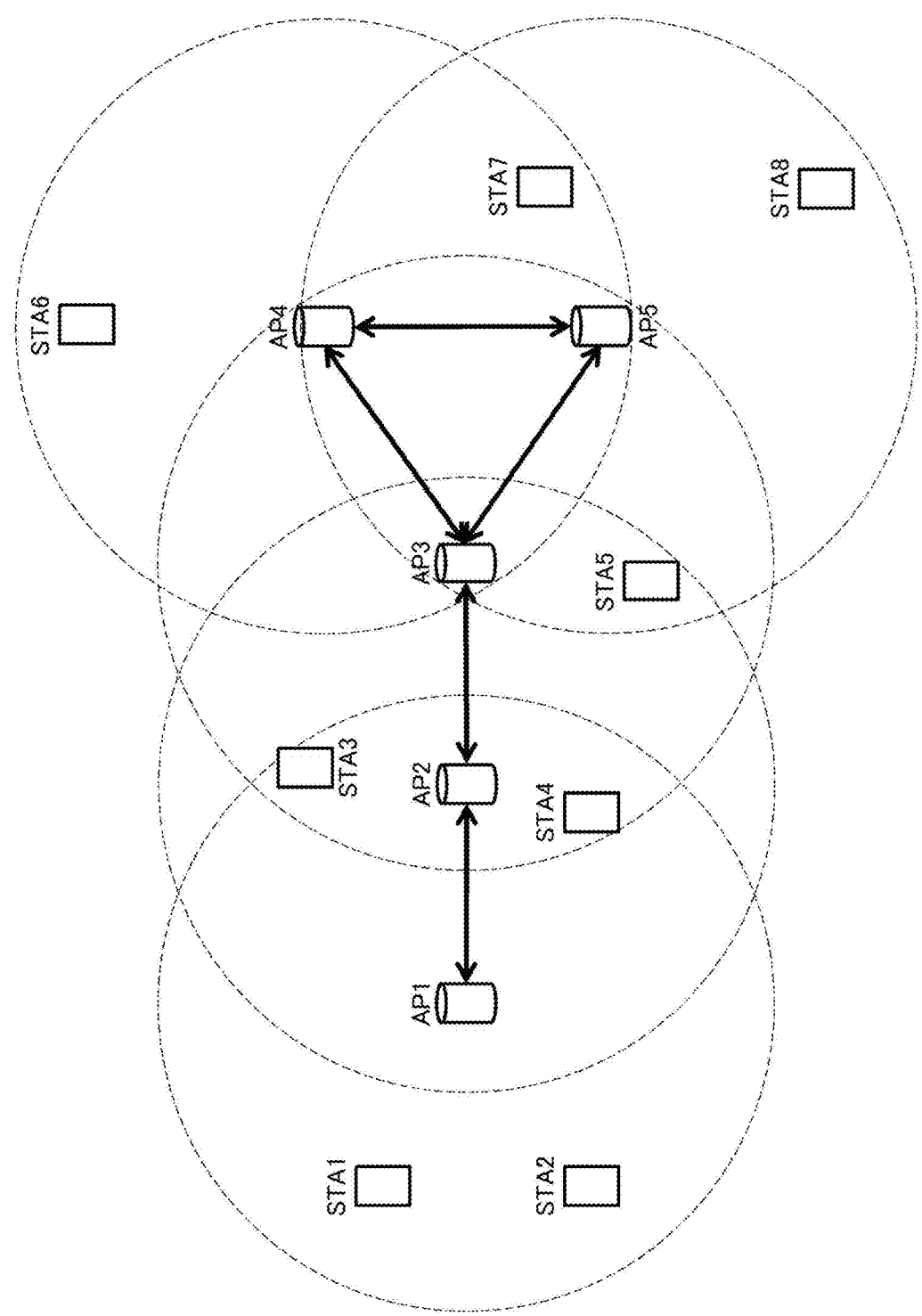
FIG. 1 is a view depicting an example of a configuration of a communication system to which the technology disclosed herein can be applied.

FIG. 1 schematically depicts an example of a configuration of a communication system to which the technology disclosed herein can be applied. The communication system depicted in FIG. 1 includes a plurality of base stations (AP 1 to AP 5) and a plurality of terminal stations (STA 1 to STA 8). Each AP is installed, for example, in a general home. The APs are AV apparatuses having AP functions, agent apparatuses, apparatuses configuring a smart home and so forth in addition to general access points. Further, the STAs are information terminals that are used in a home such as a smartphone, a tablet, and a notebook PC.

Each of circles drawn by a broken line in FIG. 1 indicates a communicatable range of an AP positioned in the middle thereof. Each AP can form a network group in which one or plural STAs are subordinates in the communicatable range of the AP itself is subordinates of the AP. The network group here corresponds, for example, to a BSS.

Further, a bidirectional arrow mark that connects two APs to each other indicates a relation between the APs that are in communicatable ranges with each other and can detect each other. APs whose communicatable ranges overlap with each other are detectable. Further, between APs whose communicatable ranges overlap with each other, it is necessary to decide whether adjustment of the communicatable range is to be performed in order to suppress mutual interference.

In the example depicted in FIG. 1, the AP 1 can detect the AP 2 included in the communicatable range of the own station. Similarly, the A2 can detect the AP 1 and the AP 3; the AP 3 can detect the AP 2, the AP 4, and the AP 5; the AP 4 can detect the AP 3 and the AP 5; and the AP 5 can detect the AP 3 and the AP 4.

It is supposed that an upper network is formed from a plurality of network groups formed from the APs. The upper network here corresponds, for example, to an ESS.

It is to be noted that the communication system to which the technology disclosed herein can be applied is not limited to that of the configuration depicted in FIG. 1, and it is to be understood that the technology disclosed herein can be applied similarly to other communication systems that are different in terms of the number or the arrangement of APs or STAs, the number of BSSs, the structure of ESSs and so forth.

Figure 2:
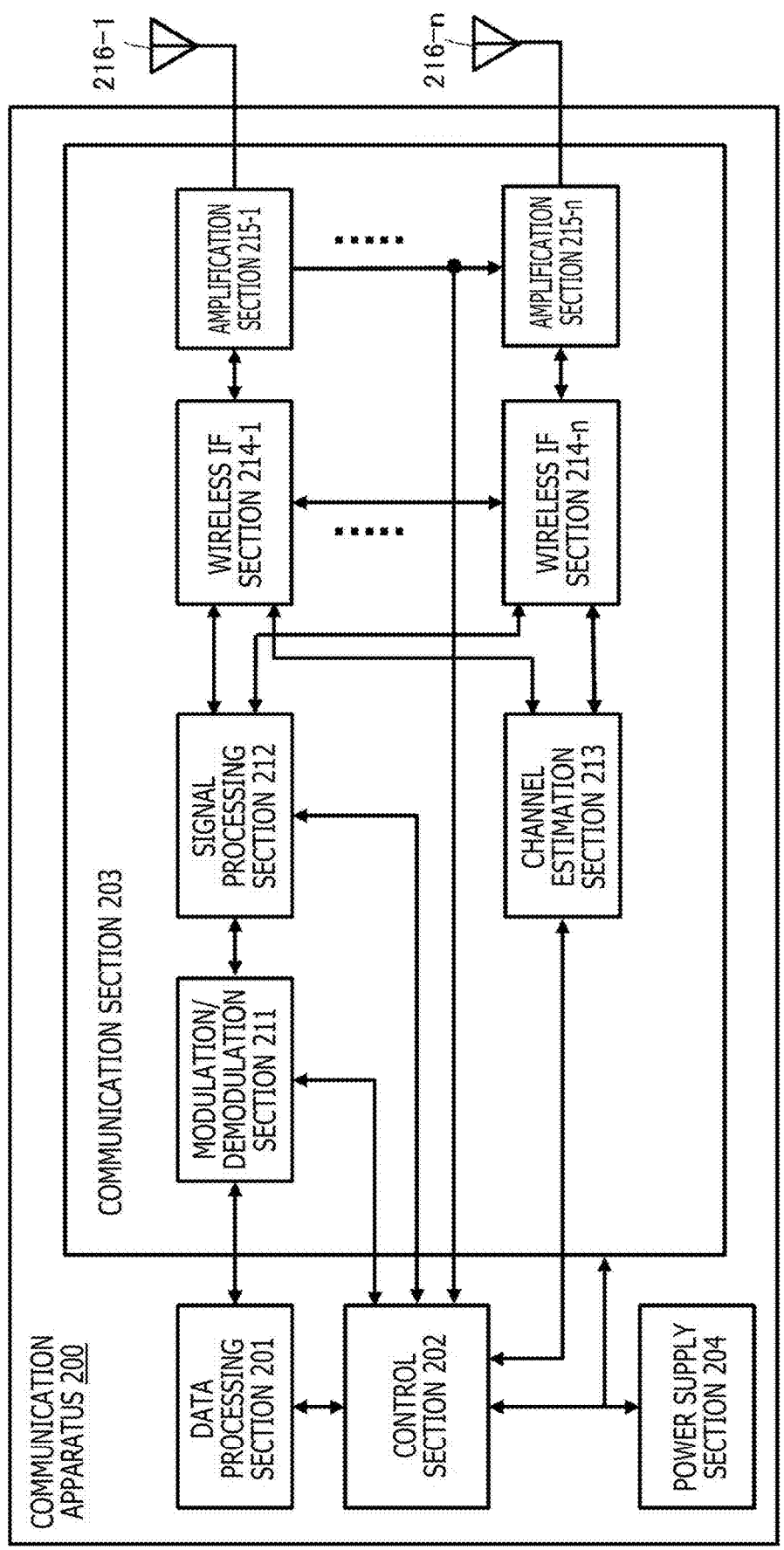
FIG. 2 is a view depicting an example of a communication apparatus 200.

FIG. 2 depicts an example of a configuration of a communication apparatus 200 to which the technology disclosed herein can be applied. The communication apparatus 200 can operate, for example, in any of the base stations (APs) and the terminals (STAs) connected to the base stations in the network topology depicted in FIG. 1.

The communication apparatus 200 includes a data processing section 201, a control section 202, a communication section 203, and a power supply section 204. Further, the communication section 203 includes a modulation/demodulation section 211, a signal processing section 212, a channel estimation section 213, a wireless interface (IF) section 214, and an amplification section 215, and an antenna 616 is connected to the amplification section 215. It is to be noted that the wireless interface section 214, the amplification section 215, and the antenna 216 may form one set and one or more such sets may form components. Further, the function of the amplification section 215 is sometimes included in the wireless interface section 214.

Upon transmission when data is inputted from a protocol upper layer (not depicted), the data processing section 201 generates a packet for wireless transmission from the data, carries out such processes as addition of a header and addition of error detection codes for media access control (MAC: Media Access Control), and provides data obtained after the processes to the modulation/demodulation section 211 in the communication section 203. In contrast, upon reception of an input from the modulation/demodulation section 211, the data processing section 201 carries out analysis of the MAC header, detection of packet errors, a reorder process of packets and so forth and provides data obtained after the processes to the protocol upper layer of the data processing section 201.

The control section 202 controls exchange of information between the components in the communication apparatus 200. Further, the control section 202 performs parameter setting in the modulation/demodulation section 211 and the signal processing section 212 and scheduling of packets in the data processing section 201. Further, the control section 202 performs parameter setting and transmission power control of the wireless interface section 214 and the amplification section 215.

In the case where the communication apparatus 200 operates as an AP, the control section 202 carries out a process for constructing an appropriate ESS in an environment in which AP arrangement and so forth are not designed in advance and also the number of APs is not fixed. In particular, the control section 202 controls operation of the communication apparatus 200 such that the communication apparatus 200 performs request for and reply to a signal for estimating an ESS structure with surrounding APs that are within the communicatable range. Further, the control section 202 estimates an ESS structure according to the number of signals detected from surrounding APs and signal intensities and decides a structure attribute of the communication apparatus 200 itself in the ESS. Furthermore, the control section 202 carries out, on the basis of a result of the decision, a process for adding information relating to the structure attribute to a signal to be transmitted from the communication apparatus 200 itself. Details of processes relating to request for and reply to a signal for estimating an ESS structure, decision of a structure attribute in the ESS, and a notification of a decision result are hereinafter described.

On the other hand, in the case where the communication apparatus 200 operates as an STA, the control section 202 controls communication operation of the communication apparatus 200 in the ESS on the basis of an estimation result of the structure of the ESS from the AP of the connection destination and a notification relating to the structure attribute of the communication apparatus 200 itself. In particular, the control section 202 carries out a process for deciding on the basis of a notification from the AP connected to the communication apparatus 200 itself, whether re-connection from an AP positioned at an end of the ESS to another AP should be performed.

At the time of transmission of a signal, the modulation/demodulation section 211 performs encoding, interleave, and modulation for input data from the data processing section 201 on the basis of coding and modulation methods set by the control section 202 to generate a data symbol stream and provides the data symbol stream to the signal processing section 212. On the other hand, at the time of reception of a signal, the modulation/demodulation section 211 performs processes reverse to those upon transmission for the input from the signal processing section 212 and provides reception data to the data processing section 201 or the control section 202.

At the time of transmission of a signal, the signal processing section 212 performs signal processing for an input from the modulation/demodulation section 211 and provides resulting one or more transmission symbol streams to the individual wireless interface sections 214. On the other hand, at the time of reception of a signal, the signal processing section 212 performs signal processing for reception symbol streams inputted from the individual wireless interface sections 214 and provides them to the modulation/demodulation section 211.

It is to be noted that the signal processing section 212 performs such spatial processes as a spatial multiplexing process of a plurality of streams at the time of signal transmission and a spatial demultiplexing process of a plurality of streams of a reception signal at the time of signal reception.

The channel estimation section 213 calculates complex channel gain information of a propagation path from a preamble part and a training signal part of an input signal from each of the wireless interface sections 214. The calculated complex channel gain information is used in a decoding process by the modulation/demodulation section 211 and a spatial process by the signal processing section 212 through the control section 202.

At the time of signal transmission, the wireless interface section 214 converts an input from the signal processing section 212 into an analog signal, carries out filtering and up conversion to a carrier frequency, and sends out a resulting signal to the antenna 216 or the amplification section 215. On the other hand, at the time of signal reception, the wireless interface section 214 carries out reverse processes for an input from the antenna 216 or the amplification section 215 and provides data to the signal processing section 212 and the channel estimation section 213.

At the time of signal transmission, the amplification section 215 amplifies an analog signal inputted from the wireless interface section 214 up to a predetermined power and sends out the amplified analog signal to the antenna 216. On the other hand, at the time of signal reception, the amplification section 215 amplifies a signal inputted from the antenna 216 up to a predetermined power by low-noise amplification and outputs the amplified signal to the wireless interface section 214. At least one of the function at the time of transmission or the function at the time of reception of the amplification section 215 is sometimes included in the wireless interface section 214.

The power supply section 204 is configured from a battery power supply or a fixed power supply and supplies power to the components in the communication apparatus 200.

Now, a procedure for performing communication, estimation of a structure of an upper network, and decision of a structure attribute by a certain AP when the certain AP newly performs formation of an upper network together with other APs and when the certain AP participates in an existing upper network is described. The upper network corresponds, for example, to an ESS including a plurality of BSSs.

Here, a case in which, in a communication system having such a topology as depicted in FIG. 1, the AP 1 to AP 5 newly perform formation of a new upper network is considered.

Formation of an upper network is started by transmission of a signal relating to start of formation of an upper network from any AP. The AP may transmit the signal spontaneously or an application of an upper layer may instruct a MAC of a lower layer to start formation of an upper network. Alternatively, a user may explicitly instruct some or all of the APs to form an upper network.

A frame including a signal relating to start of formation of an upper network includes an identifier to be used in the upper network to be formed. This frame may be transmitted to a broadcast address. Further, the AP may periodically transmit such a frame as just described. For example, a beacon frame may be used to issue a notification of start.

Meanwhile, an AP that detects such a frame as described above may decide whether the AP is to participate in an upper network designated by the frame and return a reply of a frame including information regarding acceptance of participation. If the AP of the transmission source receives a frame indicative of acceptance, then it transmits a frame relating to start of formation of an upper network with the identifier of the accepting AP added thereto.

Further, an AP that accepts participation in the upper network transmits a signal including contents similar to those of the signal relating to start of formation of an upper network. Also, this signal includes an identifier to be used in the upper network to be formed. A frame including the signal may be transmitted to the broadcast address. Further, the AP may periodically transmit such a frame as just described.

By repeating the procedure described above, an AP that is to participate in the upper network can receive a signal relating to start of formation of the upper network or contents of the signal. Further, this makes it possible, at the point of time of start of formation of the upper network, for each AP to identify the identifier of all of the other APs that are to participate in the ESS.

Figure 3:
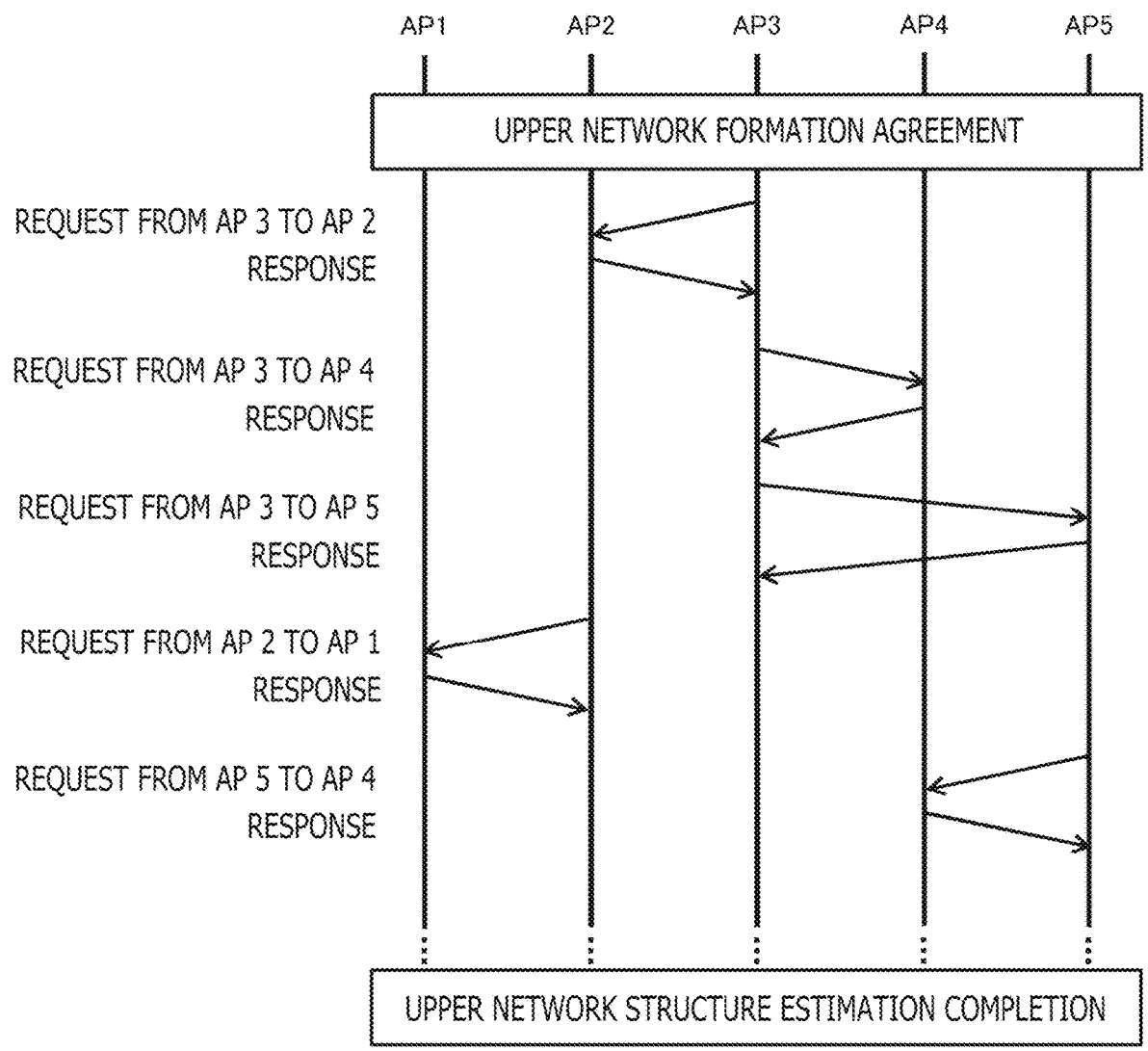
FIG. 3 is a view depicting an example of a communication sequence relating to formation of an upper network.

FIG. 3 depicts an example of a communication sequence relating to formation of an upper network, which is carried out by the communication system configuration depicted in FIG. 1.

After start of formation of an upper network is agreed, for example, the AP 3 performs communication for estimating the structure of the upper network with other APs (AP 2, AP 4, AP 5) that are present in the communicatable range thereof. It is assumed that, after completion of the communication with the AP 3 or in the middle of the communication, each of the other APs can perform similar communication with APs present in its communicatable range.

First, the AP 3 issues a request for communication for estimation of the structure of the upper network to the AP 2.

This request is performed using a frame including the identifier of the upper network in its physical header (hereinafter also referred to as a "first frame"). As the identifier, an identifier to be used in the upper network to be formed is used in the case where the identifier is included in a signal that is a signal of the AP itself or is received from another AP and that related to start of formation of the network. In the case where the AP has not yet acquired the identifier of the upper network, an identifier for universal use indicative of the new upper network (for example, an ESS-ID or the like) may be described as an identifier of the upper network in the physical header.

The destination of the first frame may be a MAC address of the request destination AP (AP 2) or may be the identifier of the upper network. In the case where the destination is the identifier of the upper network, collision avoidance by an appropriate carrier sense may be performed by a plurality of APs that is to form the upper network such that an AP that acquires a transmission right performs transmission. On the other hand, in the case where the designation is the identifier of the upper network and a first frame is transmitted together with information relating to multiple access, transmission may be performed by an AP designated in accordance with a multiple access method in which a plurality of APs that is to form the upper network is designated.

The first frame includes information relating to transmission of the first frame as information from which propagation loss of the first frame can be derived by the reception side (AP 2). For example, the information includes a transmission power, a used frequency band, and a used spatial stream number of the first frame. Further, the first frame may include information relating to transmission of a frame used to perform a return of a reply to the request (hereinafter also referred to as a "second frame") as information relating to transmission of the second frame and as information for estimating propagation loss of the second frame by the reception side (AP 1). For example, the information is information for instructing the reception side (AP 2) about a transmission power, a used frequency band, and a used spatial stream number to be used at the time of transmission of the second frame.

The AP 2 receiving the request (that is, the first frame) from the AP 3 can acquire the identifier of the upper network of the transmission source of the frame (AP 3) from the physical header. Further, the AP 2 on the reception side can measure the propagation loss between the AP 3 and the AP 2 on the basis of the reception power of the first frame and the information relating to transmission of the first frame (a transmission power, a used frequency band, a used spatial stream number and so forth).

Then, the AP 2 receiving the request (that is, the first frame) from the AP 3 returns a communication for estimating the structure of the upper network to the AP 3. The second frame used for the return of a reply includes the identifier of the upper network in the physical header thereof. For this identifier, the identifier included in the first frame is used.

Meanwhile, the second frame may include information from which propagation loss of the second frame can be derived by the reception side (AP 3) as information relating to transmission of the second frame. For example, the information is a transmission power, a used frequency band, and a used spatial stream number of the second frame.

In the case where the information relating to transmission of the second frame (a transmission power, a used frequency band, and a used spatial stream number) is indicated in the first frame, the AP 2 carries out transmission of the second frame on the basis of the information included in the first frame. In this case, it may be indicated in the second frame that the second frame is transmitted on the basis of the information described in the first frame.

The AP 3 receiving the return reply (that is, the second frame) from the AP 2 can measure the propagation loss between the AP 2 and the AP 3 on the basis of the reception power of the second frame and the information relating to transmission of the second frame (a transmission power, a used frequency band, a used spatial stream number and so forth). Although the information relating to transmission of the second frame is described in the second frame, the AP 3 itself sometimes designates the information in the first frame.

When the AP 3 receives the second frame returned from the AP 2, it decides whether communication for estimating the structure of the upper network from an AP other than the AP 2 is further required. For example, a case this in which the second frame is not received as yet from an AP other than the AP 2 present in a range within which the AP 3 itself can detect the AP is applicable to. Then, in the case where the AP 3 decides that information from an AP other than the AP 2 is required further, the procedure described above is carried out for any AP other than the AP 2 to repeat transmission of the first frame and reception of the second frame until reception of information regarding the necessary APs is completed. For example, the AP 3 repeats a similar procedure also for the AP 4 and the AP 5. Further, also the APs other than the AP 3 execute the procedure described above similarly. For example, the AP 2 executes the procedure for the AP 1 while the AP 4 executes the procedure for the AP 5.

The communication sequence including the first frame transmission and the second frame return between APs neighboring with each other is a basic procedure for estimating an upper network structure.

Subsequently, a method of collecting information acquired by communication for estimating the structure of the upper network corresponding to all APs including APs present in an undetectable range is described.

Each AP retains in the inside thereof a table configured from items for an AP and a reporter (Reporter), a measurer (Measurer,) and propagation loss (Path Loss: PL) corresponding to the AP. The propagation loss is information having a correlation to the distance between APs. At this time, in regard to other items, all APs grasped at the point of time of start of formation of the upper network are registered in the table. Further, in regard to peripheral APs detected by the AP itself, information indicating that the AP is the AP itself (Myself) is registered into Reporter and Measurer. Further, at the time of transmission of the first frame and the second frame, a list of peripheral APs detected by the AP itself is transmitted together with a list of propagation loss with the peripheral APs and a combination of APs detected by the AP, if retained. Further, in the case where the AP detects that an unknown AP participates in the upper network in the middle of a sequence described below, the AP adds the unknown AP to the table described above.

For example, in the basic procedure described above, when the AP 3 transmits the first frame to the AP 2, it transmits the first frame together with the list of APs (AP 2, AP 4, AP 5) detected by the AP 3 itself. The AP 2 registers the AP 3 into Reporter of the AP 4 and the AP 5 in the table on the basis of the list received from the AP 3.

Further, when the AP 2 transmits a second frame to the AP 3, it also transmits a list of APs (AP 1, AP 3) detected by the AP 2 itself. The AP 3 registers the AP 2 into Reporter of the AP 1 in the table on the basis of the list received from the AP 2.

Then, when the AP 3 transmits the first frame to the AP 4, it transmits the first frame together with the list of APs (AP 2, AP 4, AP 5) detected by the AP 3 itself, propagation loss with respect to the APs (PL: propagation loss between the AP 3 and the AP 2 and so forth), and a combination of the peripheral APs detected by the AP 3 (AP 2 and AP 1).

The AP 4 registers the AP 3, AP 3, and PL: AP 3-AP 2 into Reporter, Measurer, and Pathloss of the AP 2 in the table, respectively, and registers AP 3 and AP 2 into Reporter and Measurer of the AP 1 in the table, respectively, on the basis of the list included in the first frame received from the AP 3.

Then, when the AP 4 transmits the second frame to the AP 3, it also additionally transmits the list of APs (AP 3, AP 5) detected by the AP 4 itself. Further, in the case where Reporter retains Pathloss that is not of the transmission destination AP, the AP 4 issues a notification of Reporter, Measurer, and Pathloss corresponding to the AP. However, in this example, since the AP 4 retains only information of the AP 3 as Reporter, the notification is not issued. Although the AP 3 refers to the list included in the second frame received from the AP 4, since Myself is registered in Reporter of the AP 5, it is not required to be registered newly.

If the procedure described above is carried out by each AP, each AP can retain a table in which Reporter, Measurer, and Pathloss at the point of time at which the procedure goes round are registered. At this time, the table is in a state in which information lacks in several items.

Then, each AP issues, to the APs registered in Reporter, a request for information relating to Pathloss of APs whose Reporter and Measurer are registered and in which same APs are registered. This request is carried out using the first frame. At the point of time when the procedure goes round, it is supposed that such information is retained by the AP of the request destination, and therefore, each AP can register information relating to Pathloss of the necessary APs.

At the point of time at which the procedure described above goes round, each AP subsequently issues a request to the APs registered in Reporter for information relating to Pathloss of APs in which Reporter and Measurer are registered and in which the registered APs are different or information relating to Pathloss of APs in which only Reporter is registered.

Further, at the point of time at which the two procedures requesting information relating to Pathloss go round, it is supposed that such information is retained by the APs of the request destination. Therefore, each AP can register information relating to Pathloss between necessary APs.

Further, in the case where, in the middle of the procedure requesting information relating to Pathloss, an AP receives the first or second frame including, in the physical header thereof, the identifier of the upper network to which the AP itself belongs, even if the frame is not destined for the AP itself, if the AP can read contents of the frame, the AP may acquire information of the items from the frame. Further, the AP may specify in the first frame or the second frame to be transmitted from the AP itself that an AP other than the destination can read the frame.

By repeating the foregoing procedure of performing transmission and reception of the first frame and the second frame, request for information relating to Pathloss, and information reading from the first frame and the second frame, each AP can retain a table in which all of the items of the reporter (Reporter), measurer (Measurer), and propagation loss (Pathloss) corresponding to the AP are registered. For an item in regard to which appropriate information has not been obtained successfully, undecided (Unknown) is registered into the table.

For example, in the items of the AP 4 retained by the AP 1 by the procedure described above, the AP 2 as Reporter and the AP 3 (or the AP 5) as Measurer are registered, and Pathloss observed by the AP 3 (or the AP 5) is registered as Pathloss.

FIG. 10 depicts an example of a configuration of an internal table retained by the AP 3. The depicted table has an entry for each AP around the AP 3 (that is, AP 1, AP 2, AP 4, and AP 5), and in each entry, propagation loss relating to the applicable AP and a reporter (Reporter) and a measurer (Measurer) of the propagation loss are described. For example, since the AP 1 exists outside the communicatable range of the AP 3 and the AP 3 itself cannot measure propagation loss, the AP 1 receives, from the AP 2 that accommodates the AP 1 in its communicatable range, a report on propagation loss from the AP 1 measured by the AP 2. Accordingly, in the entry of the AP 1 of the table, Reporter: AP 2, Measurer: AP 2, and PL: the propagation loss between the AP 2 and the AP 1 are described. Further, since the AP 2 exists in the communicatable range of the AP 3, the AP 3 itself can measure the propagation loss. Accordingly, in the entry of the AP 2 of the table, Reporter: Myself, Measurer: Myself, and PL: the propagation loss between the AP 3 and the AP 2 are described. Similarly, since both the AP 4 and the AP 5 exist in the communicatable range of the AP 3, in the entry of each of them, Reporter: Myself and Measurer: Myself are registered, and the propagation loss measured by the AP 3 itself is described.

Meanwhile, FIG. 11 depicts an example of a configuration of an internal table retained by the AP 4. The depicted table has an entry for each AP around the AP 4 (that is, AP 1, AP 2, AP 3, and AP 5), and in each entry, propagation loss relating to the applicable AP and a reporter (Reporter) and a measurer (Measurer) of the propagation loss are described. For example, the AP 1 exists outside the communicatable range of the AP 4 and besides, exists outside the communicatable range of the AP 3 neighboring with the AP 4. In such a case as just described, the AP 4 receives, from the neighboring AP 3, a report on the propagation loss from the AP 1 measured by the AP 2 that accommodates the AP 1 in its communicatable range. Accordingly, in the entry of the AP 1 of the table, Reporter: AP 3, Measurer: AP 2, and PL: the propagation loss between the AP 2 and the AP 1 are described. Further, although the AP 2 exists outside the communicatable range of the AP 4, it exists in the communicatable range of the AP 3 neighboring with the AP 4. In such a case as just described, the AP 4 receives, from the neighboring AP 3, a report on propagation loss from the AP 2 measured by the AP 3. Accordingly, in the entry of the AP 2 of the table, Reporter: AP 3, Measurer: AP 3, and PL: the propagation loss between the AP 3 and the AP 2 are described. Meanwhile, since the AP 3 exists in the communicatable range of the AP 4 the AP 4 itself can measure the propagation loss of the AP 3. Accordingly, in the entry of the AP 3 of the table, Reporter: Myself, Measurer: Myself, and PL: the propagation loss between the AP 4 and the AP 3 are described. Similarly, since the AP 5 exists in the communicatable range of the AP 4, in the entry of AP 5 of the table, Reporter: Myself, Measurer: Myself, and PL: the propagation loss between the AP 4 and the AP 5 are described.

Figure 4:
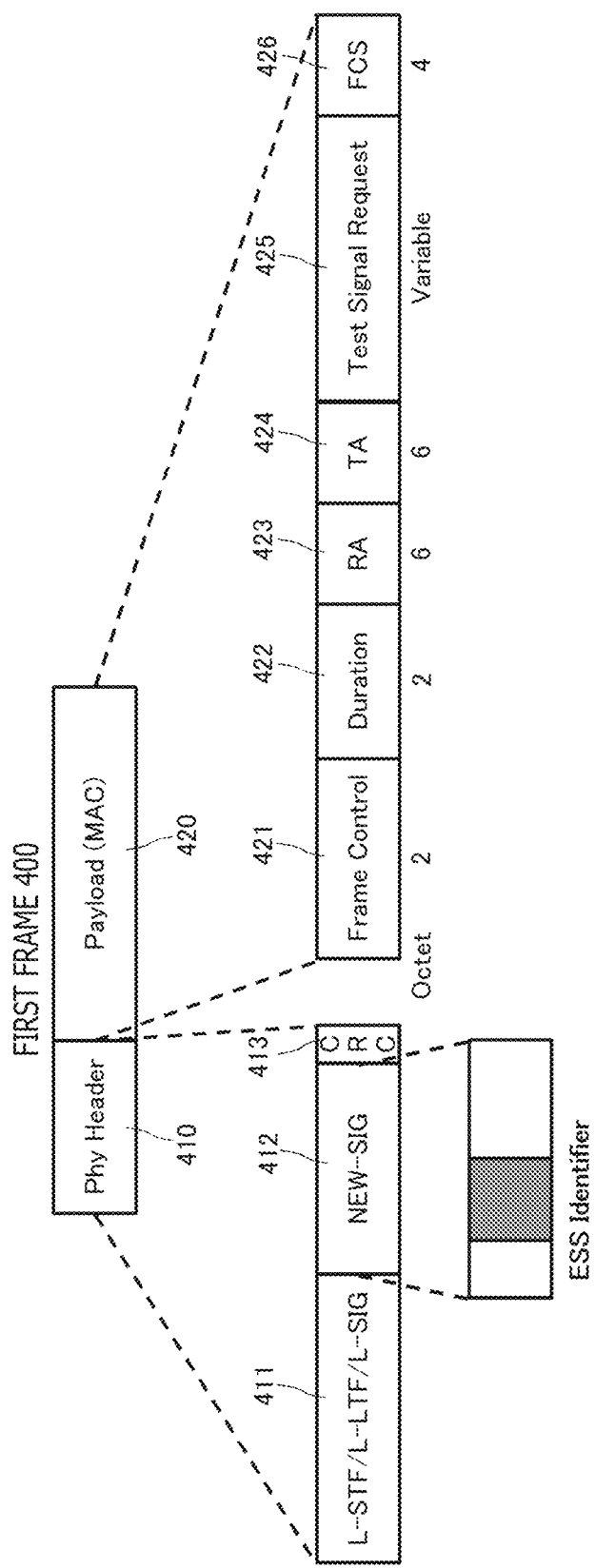
FIG. 4 is a view exemplifying a structure of a first frame used in a request for communication for estimating a structure of an upper network.

FIG. 4 exemplifies a structure of a first frame 400 used for request for communication for estimating a structure of an upper network.

A physical header (Phy Header) 410 of the first frame 400 includes a legacy field 411 that can be used by a terminal based on a conventional specification (Legacy) and signaling information 412 based on a new specification (NEW-SIG). The legacy field 411 includes a short training signal (L-STF: Legacy Short Training Field) that can be used in synchronous acquisition and so forth, a long training signal (L-LTF: Legacy Long Training Field) that can be used in channel estimation, and signaling information (L-SIG: Legacy Signal field).

To the tail end of the Phy Header 410, a CRC (Cyclic Redundancy Check) 413 is added as an error detection code. Accordingly, a receiver of this frame can check contents of the first frame 400 only from the Phy Header 410 without receiving the entire first frame 400.

Further, in the NEW-SIG 412, for example, an ESS-ID is described as an identifier to be used in the upper network. Accordingly, another wireless terminal that does not participate in the upper network can detect, without receiving the entirety of this frame, that this frame is transmitted from the upper network, in which the other wireless terminal does participate, from the tail end of the Phy Header.

Further, a payload (MAC) 420 of the first frame 400 has fields for Frame Control, Duration, RA, TA, Test Signal Request, and FCS denoted by reference numerals 421 to 426, respectively.

In the Frame Control field 421, information and so forth relating to setting of this frame are included. In the Duration field 422, information relating to a length of this frame is included. In the RA field (Receiver Address) 423, a MAC address of a request destination AP to which a request for communication for estimating a structure of an upper network is to be issued or an identifier of the upper network is included as information of a destination of this frame. Further, in the TA (Transmitter Address) field 424, a MAC address of the request source AP that issues a request for communication for estimating a structure of an upper network is included as information of a transmission source of this frame.

In the Test Signal Request field 425, information relating to a request for communication for estimating a structure of an upper network is included. For example, the Test Signal Request field 425 includes Indication indicating that this request is made, information (a transmission power, a used frequency band, and a used spatial stream number) from which the reception side of the first frame 400 can derive propagation loss as information relating to transmission of the first frame 400, information for estimating propagation loss (information for indicating a transmission power, a used frequency band, and a used spatial stream number at the time of transmission of the second frame) as information relating to transmission of the second frame to the first frame 400, information of other APs and information of the table (described hereinabove; refer to FIGS. 10 and 11) retained by the AP itself that is the transmission source of the first frame 400, information relating to APs other than the request destination, a request for information relating to the APs other than the request destination, and Indication indicating that the transmission source AP itself of the first frame 400 participates in the upper network for the first time.

The FCS (Frame Check Sequence) 426 at the tail end of the payload 420 is added in order to detect and correct errors of contents of data described in the payload 420 of the first frame 400.

Figure 5:
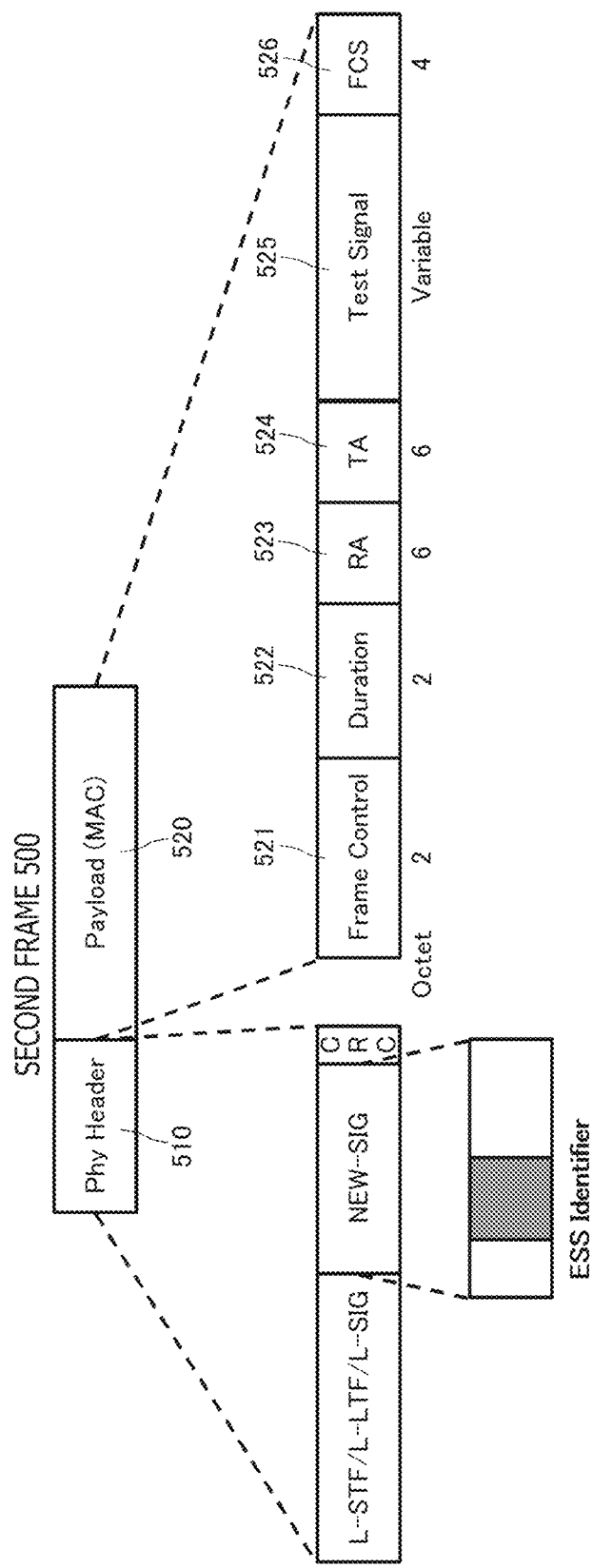
FIG. 5 is a view exemplifying a structure of a second frame used in a reply to a first frame.

Meanwhile, FIG. 5 exemplifies a structure of a second frame 500 used for reply to the first frame 400.

A configuration of a physical header 510 of the second frame 500 is similar to that of the first frame 400, and therefore, detailed description of the same is omitted. It is to be noted that, in NEW-SIG in the physical header 510, for example, the ESS-ID is described as an identifier to be used in the upper network.

Further, similarly to the first frame 400, a payload (MAC) 520 of the second frame 500 includes fields for Frame Control, Duration, RA, and TA denoted by reference numerals 521 to 524, respectively, and an FCS 526 for detecting and correcting errors of contents of data are added to the tail end. The RA field 523 includes a MAC address of the AP of the request source of the communication (that is, the transmission source of the first frame 400) or an identifier of the upper network.

The payload (MAC) 520 of the second frame 500 has a Test Signal field 525. The Test Signal field 525 includes information relating to a reply to communication for estimating a structure of the upper network. For example, the Test Signal field 525 includes Indication indicating that a reply to the first frame 400 has been made, (a transmission power, a used frequency band, and a used spatial stream number) for allowing the reception side of the second frame 200 to estimate propagation loss as information relating to transmission of the second frame 500, information relating to the other APs and information of the table retained by the AP itself that returns a reply to the second frame 500, and Indication indicating that the AP itself of the transmission source is to participate in the upper network for the first time.

Now, a procedure for allowing another AP to newly participate in an upper network in a state in which the upper network is already formed is described.

The AP that is to newly participate in the upper network acquires the identifier of the upper network from a signal transmitted from any of the APs that form the upper network.

Thereafter, the AP that is to newly participate in the upper network transmits a first frame to any AP configuring the upper network. As already described, the first frame includes a signal requesting communication for estimating a structure of the upper network. The first frame may include information indicating that the AP itself of the transmission source is to newly participate in the upper network in addition to the information depicted in FIG. 4.

On the other hand, the AP that receives the first frame replies to the request. Along with this, the AP adds the AP of the transmission source of the first frame to the table retained in the AP itself. Further, the AP receiving the first frame transmits information indicating that the new AP has participated in the upper network to the other APs. This information transmission may be performed by any of the first frame and the second frame.

The APs that form the upper network recognize the presence of the AP that newly participates in the upper network and add the AP to the table retained therein by such a procedure as described above and then execute a procedure for structure decision again.

Figure 6:
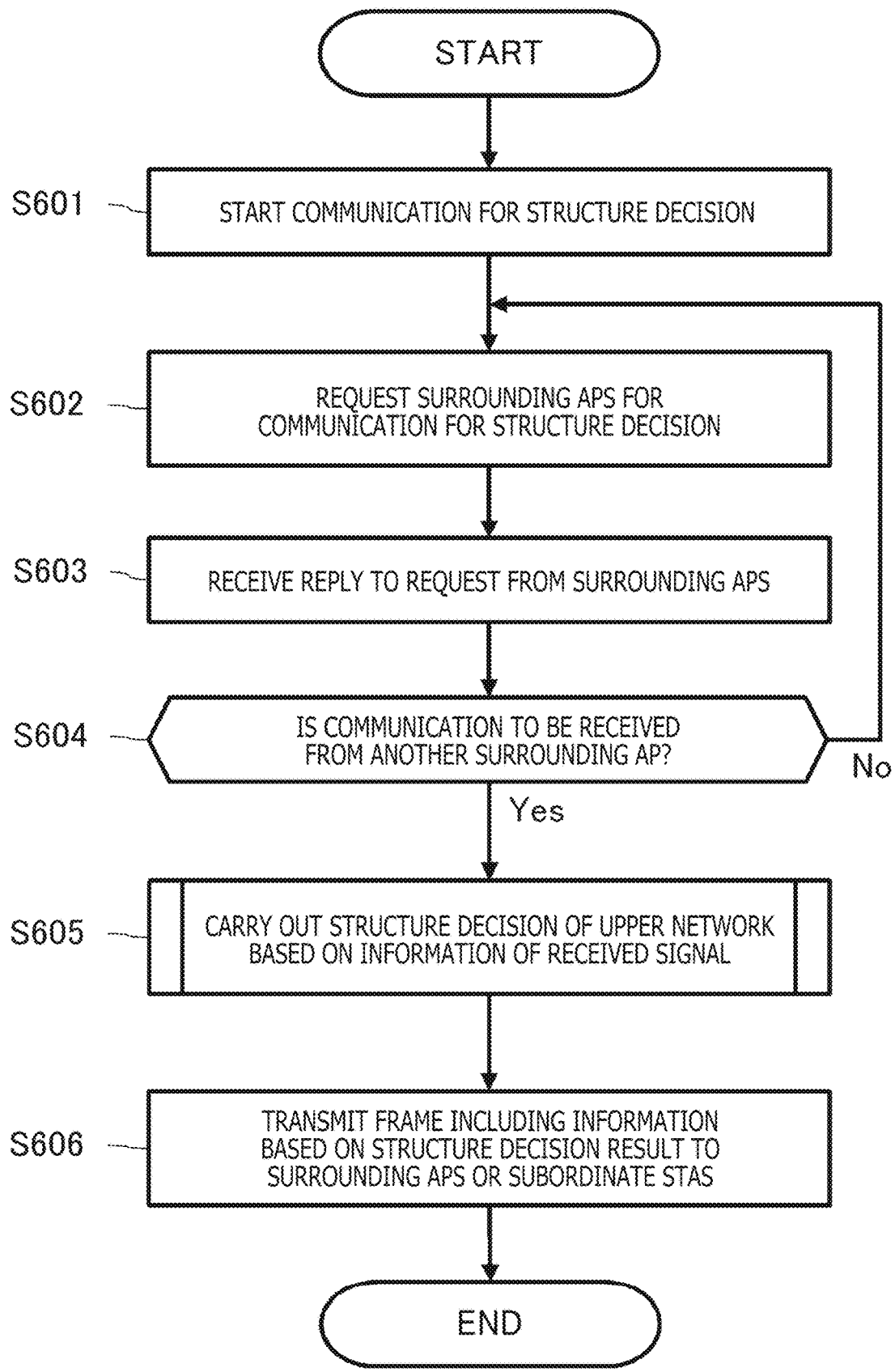
FIG. 6 is a flow chart depicting a processing procedure for performing communication for estimating a structure of an upper network (in the case where a first frame is transmitted).

FIG. 6 depicts a processing procedure for allowing an AP which is to newly participate in an upper network to perform communication for estimating a structure of the upper network in the form of a flow chart. When the AP transmits the first frame, it executes this processing procedure.

The AP starts communication for structure decision (step S601) and transmits a first frame to surrounding APs to request for communication for structure decision of an upper network (step S602). The AP may use the first frame to ask the AP of the transmission destination of the first frame whether there exists an AP that cannot be detected by the AP itself.

Then, the AP receives a second frame transmitted from surrounding APs and responding to the request described above, that is, the first frame (step S603). The AP may measure, from each of the received second frames, propagation loss with respect to the AP of the transmission source of the second frame and register the propagation loss into the information of the internal table.

Further, the AP checks, on the basis of contents of the description of the second frame, whether there remains an AP that cannot be detected by the AP itself. Then, in the case where an AP that requests for return of a second frame remains around the AP (that is, in the case where there remains a base station that cannot be detected by the AP itself) (No in step S604), the processing returns to step S602, and the first frame is transmitted repetitively.

If reception of the second frame from the surrounding APs is completed (Yes in step S6034), then the AP carries out structure decision of the upper network on the basis of information described in the received second frames (step S605).

Then, the AP transmits a frame including information based on a result of the structure decision in step S605 to the surrounding APs or subordinate STAs (step S606), and then the present processing is ended.

Figure 7:
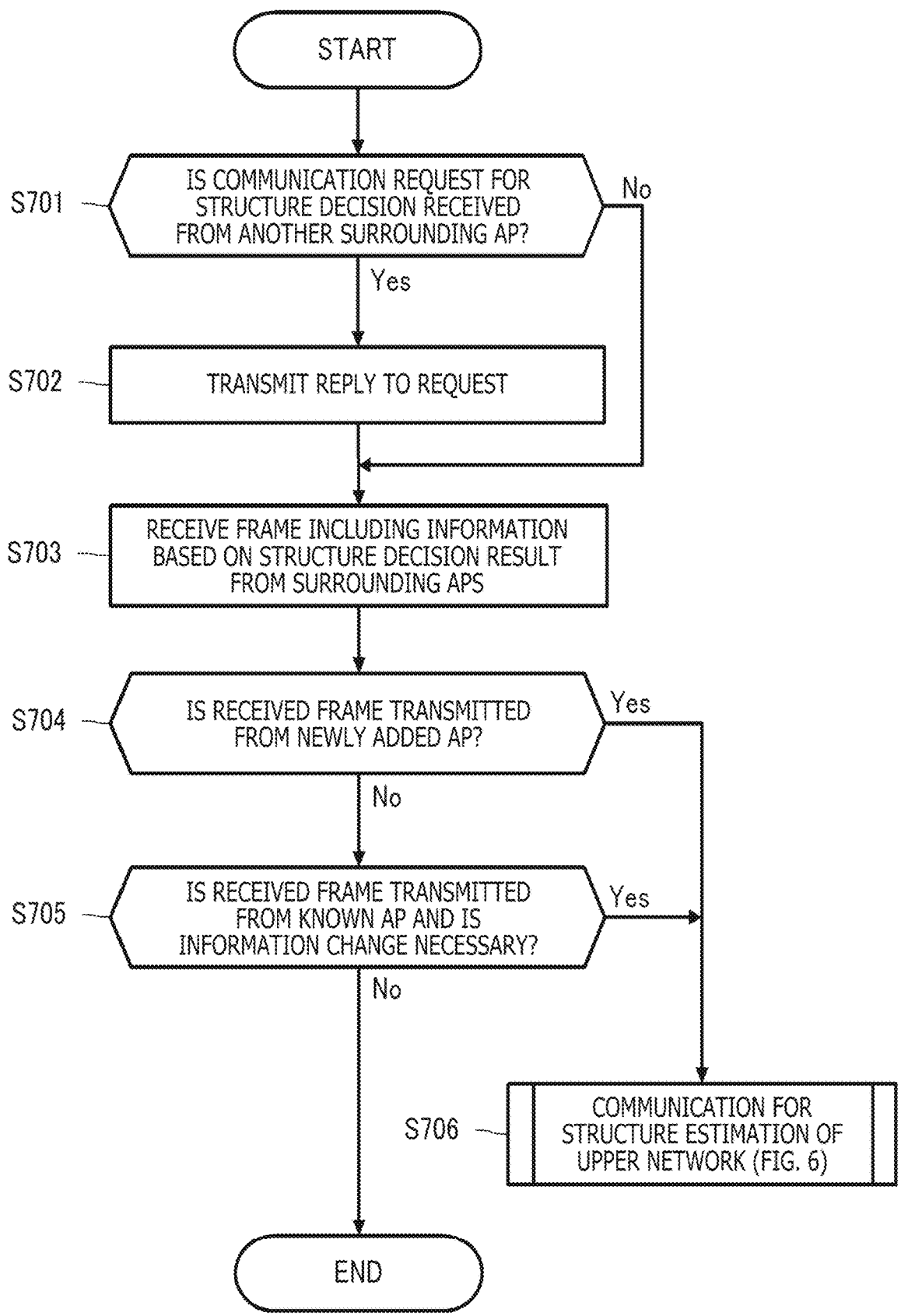
FIG. 7 is a flow chart depicting a processing procedure for performing communication for estimating a structure of an upper network (in the case where a first frame is received and a second frame is sent back).

FIG. 7 depicts a processing procedure for allowing an AP which forms an upper network to perform communication for estimating a structure of the upper network in the form of a flow chart. When a first frame is received from another AP, the AP carries out this processing procedure and returns a second frame.

If the AP receives a first frame requesting communication for structure decision of the upper network from another surrounding AP (step S701), then it returns a second frame for replying to the request (step S702).

In the case where the AP is asked by the first frame to check whether an AP that cannot be detected by the AP of the transmission source of the first frame exists, the AP may issue a notification of a result of the checking using a second frame. Further, the AP may use a second frame to ask an AP of a transmission destination of the second frame about whether an AP that cannot be detected by the AP itself exists.

Further, the AP receives a frame including information based on a result of structure decision of the upper network from surrounding APs (step S703). Details of the frame including information based on a result of structure decision of the upper network are described below.

Then, in the case where this reception frame has been transmitted from a base station newly added to the upper network (Yes in step S704), the AP carries out a process for performing communication for estimating a structure of the upper network in accordance with the procedure depicted in FIG. 6 (step S706).

Further, in the case where the reception frame has been transmitted from a known AP and there is the necessity to change the information of the upper network (Yes in step S705), the AP carries out a process for performing communication for estimating a structure of the upper network in accordance with the procedure depicted in FIG. 6 (step S706).

Figure 8:
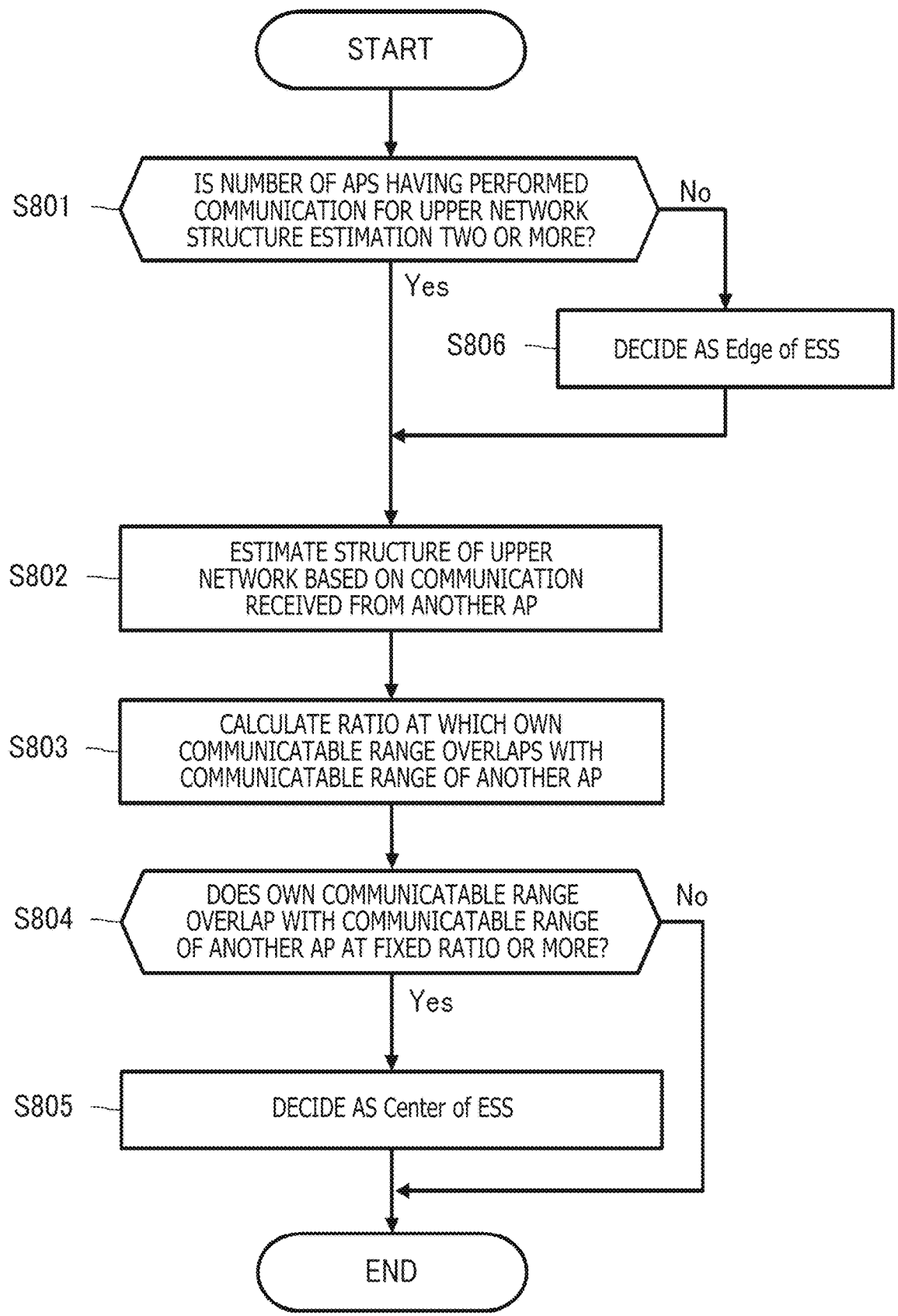
FIG. 8 is a flow chart depicting a processing procedure for estimating a structure of an upper network.

If the communication for estimating a structure of the upper network is completed (that is, if any one of the processes of FIG. 6 and FIG. 7 is completed), then the AP carries out a process for estimating a structure of the upper network on the basis of the information acquired through the series of communications. FIG. 8 depicts a processing procedure for estimating a structure of the upper network (a structure attribute of the AP itself in the upper network) in the form of a flow chart.

If the communication for estimating a structure of the upper network is completed, then the AP first decides whether the number of APs that have performed communication for structure estimation of the upper network is two or more (step S801).

Here, in the case where the number of APs that have performed communication for structure estimation of the upper network is not more than 1 (No in step S801), the structure attribute of the AP itself is an "end AP" of the upper network (Edge of ESS) (step S806).

Then, the AP estimates the structure of the upper network on the basis of the communication received from the other APs (step S802). In the estimation in this processing step, the AP estimates a relative positional relation of all APs on the basis of the propagation losses with the APs and the propagation losses between the other APs.

Then, the AP calculates a ratio at which the communicatable range of the AP itself overlaps with communicatable ranges of the other APs (step S803).

In the processing step S803, the ratio at which the communicatable ranges overlap is calculated on the basis of a result of the estimation of the structure of the upper network and the transmission powers of the AP itself and the other APs or a signal detection threshold value. The communicatable range can be obtained by setting a certain AP as a center and deriving a reach range of transmission power of the AP.

Further, in the processing step S803, a ratio at which the communicatable range of the AP itself overlaps with the communicatable ranges of the other APs is calculated from the communicatable ranges and the relative positional relation of all APs participating in the upper network.

Then, the AP performs decision of whether the ratio at which the communicatable range of the AP itself overlaps with the communicatable ranges of the other APs is equal to or higher than a certain fixed value (step S804).

Here, in the case where the ratio at which the communicatable range of the AP itself overlaps with the communicatable ranges of the other APs is equal to or higher than the certain fixed value (Yes in step S804), the AP decides that the AP itself is a "middle AP" of the upper network (Center of ESS) (step S805). Then, the present processing ends.

On the other hand, in the case where the ratio at which the communicatable range of the AP itself overlaps with the communicatable ranges of the other APs is lower than the certain fixed value (No in step S804), the AP ends the present processing immediately. Accordingly, in the case where it is decided in step S806 that the AP is an "end AP" of the upper network (Edge of ESS), the decision result is established.

By the foregoing processes (that is, by carrying out the processing procedures depicted in FIGS. 6 to 8), it is possible for each AP to estimate the structure of the upper network and decide a structure attribute of the AP itself in the upper network.

Further, after the AP decides the structure attribute of the AP itself in the upper network, it may notify surrounding APs or subordinate STAs of information relating to the structure attributes.

Figure 9:
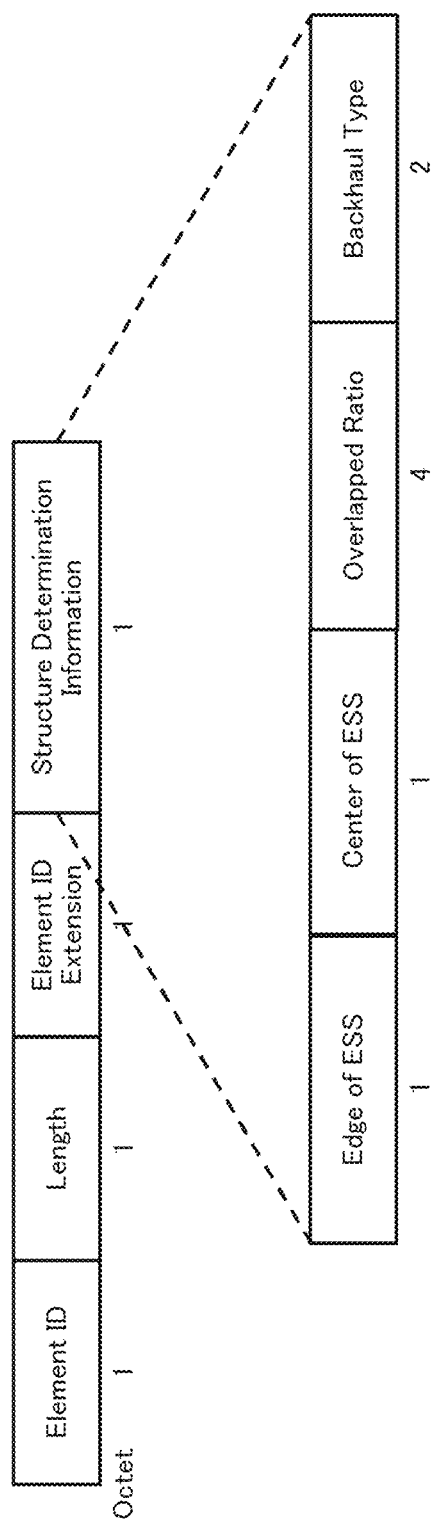
FIG. 9 is a view depicting an example of a configuration of an information element to be used for notification of a structure attribute in an upper network.

FIG. 9 depicts an example of a configuration of an information element (Information Element) that can be used by the AP for notification of a structure attribute of the AP itself in the upper network.

The AP may place this information element into a control frame, a management frame, a data frame or the like to perform notification. In any case, it is assumed that the AP performs notification of a structure attribute of the AP itself in the upper network by using a frame including an identifier to be used in the upper network (for example, an ESS-ID or a like identifier) in the physical header thereof. Accordingly, an AP or a terminal belonging to another upper network can decide whether the information element placed in a reception frame is to be received only by decoding the physical header, and the necessity for decoding the entire frame is eliminated.

Element ID and Element ID Extension indicate a type of the information element. Length indicates a length of the information element.

Structure Determination Information indicates information relating to a structure attribute of the AP itself that transmits the information element. Structure Determination Information field has fields for Edge of ESS, Center of ESS, Overlapped Relation, and Backhaul Type.

In Edge of ESS, in the case where the structure attribute of the AP itself that transmits this information element is an "end AP," 1 is described for notification. Consequently, the AP can cause (or prompt) a subordinate STA to perform decision for performing re-connection to another AP to which a notification of Edge of ESS is not sent.

In Center of ESS, 1 is described for notification in the case where the structure attribute of the AP itself that transmits this information element is determined to be a "middle AP." Consequently, the AP can cause (or prompt) a subordinate STA to perform decision such that re-connection to the other APs to which the notification of Center of ESS is not sent is not performed. Further, the AP can cause (or prompt) the other APs to perform decision such that transmission power is controlled and operation for suppressing interference is performed.

Overlapped Ratio indicates a ratio at which the communicatable range of the AP itself that transmits this information element overlaps with the communicatable ranges of the other APs. For example, in the case where Overlapped Ratio is notified with 4 bits, numerical values where the ratio from 0 to 1 is divided into 16 stages are defined in advance, and a bit corresponding to a numerical value closest to the ratio is described in the field.

Backhaul Type indicates information relating to connection to a backhaul circuit of the AP that transmits this information element. For example, four types of wired connection, portable telephone network connection, multi-hop connection, and other connection are notified with 2 bits.

If an AP receives such information element from peripheral APs, then it retains information the information element has. For example, the AP registers and adds items of Structure Determination to corresponding APs of the table retained in the inside of the AP. FIGS. 12 and 13 depict examples of a configuration of an internal table which are retained by the AP 3 and the AP 4 and in which the items of Structure Determination are added.

In the case where the AP receives an information element different from the registered contents from another AP whose Structure Determination is already registered, it re-registers Structure Determination into the table retained therein. At this time, the AP may decide that the known structure attribute of the AP itself that forms the upper network has been changed, delete some or all of the items registered in the table, carry out communication for estimating the structure of the upper network, again, and then, perform estimation of the structure of the upper network and a decision process of the structure attribute of the AP itself (refer to FIG. 8).

Further, also in the case where the AP decides that an AP observed for the first time has participated in the upper network, the AP may carry out communication for estimating a structure of the upper network, again, to perform estimation of the structure of the upper network and a decision process of the structure attribute of the AP itself (refer to FIG. 8).

As described so far, according to the technology disclosed herein, in an environment in which AP arrangement, AP number and so forth are not designed in advance, each AP itself can perform formation of an ESS. Further, since each AP can estimate a structure of an ESS and decide a structure attribute of the AP itself, a manager is unnecessary. Further, it is possible for each AP to notify surrounding APs and subordinate STAs of a result of estimation of the ESS structure and a structure attribute of the AP itself.

Then, by giving such notification as described above to the subordinates STA and the surrounding APs, the AP can cause the subordinates STA to appropriately decide whether re-connection from an AP positioned at an end of the ESS to another AP should be performed. Further, the AP can cause the subordinates STA to appropriately decide such that re-connection from an AP positioned in the middle of the ESS to another AP is not performed. Further, the AP allows an AP whose communicatable range overlaps with the communicatable range of the AP itself to appropriately decide whether it should perform adjustment of the communicatable range and can suppress interference with the communicatable range of the AP itself.

According to the technology disclosed herein, in such a communication environment that, for example, a plurality of APs is provided in a general home (including, in addition to general APs, AV apparatuses having an AV function, agent apparatuses, apparatuses configuring a smart home and so forth) and the APs are connected to a single backhaul or a small number of backhauls and further to a wide-area network, a user can connect a used terminal (STA) of the user itself to one in-home network without being aware of the presence of the individual APs in the home. Consequently, the usability is improved.

INDUSTRIAL APPLICABILITY

The technology disclosed herein has been described in detail with reference to a particular embodiment. However, it is self-evident that those skilled in the art can perform amendment or substitution of the embodiment without departing from the subject matter of the technology disclosed herein.

The technology disclosed herein can be applied to a wireless network based, for example, on the IEEE802.11 standard. However, the application range of the technology disclosed herein is not limited to a specific communication standard. In the case where an upper network including a plurality of network groups is formed, by applying the technology disclosed herein, a base station can estimate a structure of the upper network and decide a structure attribute of the base station itself in the upper network to notify the other base stations and subordinate terminals of them. The other base stations can appropriately adjust their communicatable range on the basis of the notification from the surrounding base station. It is to be noted that it becomes possible for each terminal to appropriately decide, on the basis of the notification of the base station of the connection destination, whether or not re-connection to the other base station is permissible.

In short, the technology disclosed herein has been described by way of example, and the contents of the present specification should not be construed limitatively. In order to decide the subject matter of the technology disclosed herein, the claims should be taken into account.

It is to be noted that the technology of the disclosure of the present specification can also take such configurations as described below.

(1)

A communication apparatus, including:

a communication section configured to transmit and receive a wireless signal; and a control section configured to control transmission and reception of the wireless signal, in which the control section controls communication for estimating a structure of an upper network.

(2)

The communication apparatus according to (1) above, in which, when the communication apparatus operates as a base station, the control section controls a communication sequence for forming an upper network with another base station.

(3)

The communication apparatus according to (2) above, in which the control section controls transmission of a first frame requesting communication for estimating a structure of the upper network to the another base station.

(4)

The communication apparatus according to (3) above, in which the first frame includes identification information of the upper network in a physical header of the first frame.

(5)

The communication apparatus according to (3) or (4) above, in which a destination of the first frame includes an address of the another base station requesting return of a reply to the first frame or identification information of the upper network.

(6)

The communication apparatus according to any one of (3) to (5) above, in which the first frame includes information relating to transmission of the first frame.

(6-1)

The communication apparatus according to (6) above, in which the information relating to transmission of the first frame includes information (a transmission power, a used frequency band, and a used spatial stream number) from which propagation loss of the first frame is derivable.

(7)

The communication apparatus according to any one of (3) to (6) above, in which the first frame includes information relating to transmission of a second frame to be returned as a reply to the first frame.

(7-1)

The communication apparatus according to (7) above, in which the information relating to transmission of the second frame includes information (a transmission power, a used frequency band, and a used spatial stream number) for estimating propagation loss of the second frame.

(8)

The communication apparatus according to any one of (3) to (7) above, in which the first frame includes information relating to another base station retained by the communication apparatus itself.

(9)

The communication apparatus according to any one of (3) to (8) above, in which the first frame includes a request for information relating to a base station other than a destination.

(10)

The communication apparatus according to any one of (3) to (9) above, in which the first frame includes information relating to participation of the communication apparatus itself in the upper network.

(11)

The communication apparatus according to any one of (2) to (10) above, in which the control section controls a return of reply of the second frame to a request for communication for estimating a structure of the upper network from another base station.

(12)

The communication apparatus according to (11) above, in which the second frame includes identification information of the upper network in a physical header of the second frame.

(13)

The communication apparatus according to (11) or (12) above, in which a destination of the second frame includes an address of a base station of a transmission source of the first frame or identification information of the upper network.

(14)

The communication apparatus according to any one of (11) to (13) above, in which the second frame includes information relating to transmission of the second frame.

(14-1)

The communication apparatus according to (14) above, in which the information relating to transmission of the second frame includes information (a transmission power, a used frequency band, and a used spatial stream number) from which propagation loss of the second frame is derivable.

(15)

The communication apparatus according to any one of (11) to (14) above, in which the second frame includes information relating to another base station retained by the communication apparatus itself.

(16)

The communication apparatus according to any one of (11) to (15) above, in which the second frame includes information relating to participation of the communication apparatus itself in the upper network.

(17)

The communication apparatus according to any one of (2) to (16) above, in which, in a case where it is decided that there is a base station that is undetectable by the communication apparatus itself in the upper network, the control section requests another base station for information relating to the base station that is undetectable.

(18)

The communication apparatus according to (17) above, in which the control section performs the decision on the basis of information included in communication for estimating a structure of the upper network.

(19)

The communication apparatus according to (17) above, in which the control section performs the decision on the basis of a result of checking by another base station.

(20)

The communication apparatus according to any one of (2) to (19) above, in which the control section performs estimation of a structure of the upper network and decision of a structure attribute of the communication apparatus itself in the upper network on the basis of information relating to another base station acquired through communication for estimating a structure of the upper network.

(21)

The communication apparatus according to (20) above, in which, in a case where the number of base stations that have performed communication for estimating a structure of the upper network is not more than one, the control section decides that the communication apparatus itself exists at an end of the upper network.

(22)

The communication apparatus according to (20) or (21) above, in which the control section decides whether the communication apparatus itself exists in a middle of the upper network on the basis of a ratio at which a communicatable range of the communication apparatus itself overlaps with a communicatable range of another base station.

(23)

The communication apparatus according to any one of (20) to (22) above, in which a notification of information relating to a decision result of a structure attribute of the communication apparatus itself issued to another base station or a subordinate terminal is controlled.

(24)

The communication apparatus according to any one of (20) to (23) above, in which a notification of information relating to a decision result of a structure attribute of the communication apparatus itself is given using a frame including identification information of the upper network in a physical header of the frame.

(25)

The communication apparatus according to any one of (20) to (24) above, in which a notification is issued to the effect that the communication apparatus itself is a base station existing at the end or in the middle of the upper network.

(26)

The communication apparatus according to any one of (20) to (25) above, in which a notification of information relating to a ratio at which a communicatable range of the communication apparatus itself overlaps with a communicatable range of another base station is issued.

(27)

The communication apparatus according to any one of (20) to (26) above, in which a notification of information relating to backhaul connection of the communication apparatus itself is issued.

(28)

The communication apparatus according to any one of (20) to (27) above, in which, in a case where it is decided that a base station observed for the first time has participated in the upper network or where it is decided that a structure attribute of a known base station that forms the upper network has been changed, the control section performs estimation of a structure of the upper network and decision of a structure attribute of the communication apparatus itself in all upper networks.

(29)

A communication method for a communication apparatus that operates as a base station, the method including:

a step of carrying out communication for estimating a structure of an upper network with another base station;

a step of performing, on the basis of a result acquired by communication for estimating the structure of the upper network, estimation of a structure of the upper network and performing decision of a structure attribute of the base station itself in the upper network; and a step of issuing a notification of information relating to a decision result of a structure attribute of the base station itself to another base station or a subordinate terminal.

REFERENCE SIGNS LIST

200 . . . Communication apparatus, 201 . . . Data processing section, 202 . . . Control section
203 . . . Communication section, 204 . . . Power supply section
211 . . . Modulation/demodulation section, 212 . . . Signal processing section, 213 . . . Channel estimation section
214 . . . Wireless interface section, 215 . . . Amplification section
216 . . . Antenna

The invention claimed is:

1. A communication apparatus configured to operate as a first base station, the communication apparatus comprising:
a communication section configured to execute a communication sequence with a second base station; and
a control section configured to:
control the communication sequence to form an upper network with the second base station; and
control transmission of a first frame to the second base station, wherein
the first frame is transmitted to request communication for estimation of a structure of the upper network, and
the first frame includes information relating to transmission of a second frame to be returned as a reply to the first frame.

2. The communication apparatus according to claim 1, wherein the first frame further includes identification information of the upper network in a physical header of the first frame.

3. The communication apparatus according to claim 1, wherein the first frame further includes information relating to the transmission of the first frame.

4. The communication apparatus according to claim 1, wherein the first frame further includes information relating to the second base station retained by the first base station.

5. The communication apparatus according to claim 1, wherein the first frame further includes information relating to participation of the first base station in the upper network.

6. The communication apparatus according to claim 1, wherein the control section is further configured to control a return of the reply of the second frame from the second base station for the estimation of the a structure of the upper network.

7. The communication apparatus according to claim 6, wherein the second frame includes identification information of the upper network in a physical header of the second frame.

8. The communication apparatus according to claim 6, wherein the second frame includes the information relating to the transmission of the second frame.

9. The communication apparatus according to claim 6, wherein the second frame includes information relating to a third base station retained by the second base station.

10. The communication apparatus according to claim 6, wherein the second frame includes information relating to participation of the second base station in the upper network.

11. The communication apparatus according to claim 1, wherein the control section is further configured to:
acquire information relating to the second base station based on the transmission of the first frame;
estimate the structure of the upper network based on the information relating to the second base station; and
determine a first structure attribute of the first base station in the upper network based on the estimated structure of the upper network.

12. The communication apparatus according to claim 11, wherein, in a case where a number of base stations that execute the communication for the estimation of the structure of the upper network is equal to one, the control section is further configured to determine the first base station exists at an end position of the upper network.

13. The communication apparatus according to claim 11, wherein the control section is further configured to determine the first base station exists in a middle position of the upper network based on a ratio at which a communicatable range of the first base station overlaps with a communicatable range of the second base station.

14. The communication apparatus according to claim 11, wherein the communication section is further configured to issue, to at least one of the second base station or a subordinate terminal, a notification of information relating to the determined first structure attribute of the first base station.

15. The communication apparatus according to claim 11, wherein the communication section is further configured to issue a notification that indicates the first base station exists in one of an end position of the upper network or a middle position of the upper network.

16. The communication apparatus according to claim 11, wherein, in a case where at least one of a third base station observed for a first time has participated in the upper network or a second structure attribute of a fourth base station that forms the upper network has been changed, the control section is further configured to estimate the structure of the upper network and determine a third structure attribute of the first base station in the upper network.

17. A communication method for a communication apparatus that operates as a first base station, the communication method comprising:
controlling a communication sequence for forming an upper network with a second base station;

controlling transmission of a first frame to the second base station, wherein
  the first frame is transmitted for requesting communication for estimation of a structure of the upper network, and
  the first frame includes information relating to transmission of a second frame to be returned as a reply to the first frame;
receiving the second frame from the second base station based on the first frame;
estimating the structure of the upper network based on the received second frame;
determining a structure attribute of the first base station in the upper network based on the estimated structure of the upper network; and
issuing a notification of information relating to a result of the determination of the structure attribute of the first base station to at least one of the second base station or a subordinate terminal.

18. A communication apparatus configured to operate as a first base station, the communication apparatus comprising:
  a communication section configured to execute a communication sequence with a second base station; and
  a control section configured to:
    control the communication sequence to form an upper network with the second base station; and
    control transmission of a frame to the second base station, wherein
      the frame is transmitted to request communication for estimation of a structure of the upper network, and
      the frame includes information relating to the transmission of the frame.

* * * * *